United States Patent
Yeh et al.

(10) Patent No.: US 12,455,410 B2
(45) Date of Patent: Oct. 28, 2025

(54) RING-SHAPED LIGHT GUIDE MODULE AND LIGHT EMITTING DEVICE

(71) Applicant: Primax Electronics Ltd., Taipei (TW)

(72) Inventors: Ming-Hui Yeh, Taipei (TW); Ruey-Piin Wang, Taipei (TW); Yin-Liang Hu, Taipei (TW); Chia-Ming Li, Taipei (TW); Ming-Han Yu, Taipei (TW); Wei-Ping Chan, Taipei (TW)

(73) Assignee: Primax Electronics Ltd., Taipei (TW)

( * ) Notice: Subject to any disclaimer, the term of this patent is extended or adjusted under 35 U.S.C. 154(b) by 280 days.

(21) Appl. No.: 18/217,321

(22) Filed: Jun. 30, 2023

(65) Prior Publication Data

US 2024/0402409 A1 Dec. 5, 2024

(30) Foreign Application Priority Data

May 29, 2023 (TW) .................................. 112119981

(51) Int. Cl.
*F21V 8/00* (2006.01)
*G02B 6/00* (2006.01)

(52) U.S. Cl.
CPC ......... *G02B 6/0021* (2013.01); *G02B 6/0041* (2013.01); *G02B 6/0055* (2013.01); *G02B 6/0058* (2013.01); *G02B 6/0083* (2013.01); *G02B 6/0088* (2013.01); *G02B 6/0093* (2013.01)

(58) Field of Classification Search
CPC ............. F21Y 2103/33; F21Y 2103/10; F21Y 2105/12; F21Y 2103/30; G02B 6/0068; G02B 6/0021; G02B 6/001; G02B 6/0018; G02B 6/0036; G02B 6/0038; G02B 6/0046; G02B 6/0028; G02B 6/0073; G02B 6/0055; G02B 6/0001; G02B 6/0088; G02B 6/0011; G02B 6/0031; G02B 6/0045; G02B 6/009; G02B 6/002; G02B 6/0051; G02B 6/0083
See application file for complete search history.

(56) References Cited

U.S. PATENT DOCUMENTS

2006/0023468 A1* 2/2006 Takahashi ............. B60R 13/005
362/555
2018/0202626 A1* 7/2018 Thoday ................. B60R 13/005

* cited by examiner

*Primary Examiner* — Michelle R Connelly
(74) *Attorney, Agent, or Firm* — KIRTON McCONKIE; Evan R. Witt

(57) ABSTRACT

The present disclosure provides a ring-shaped light guide module, which includes a ring-shaped light guide plate, a circuit board, a plurality of top light-emitting elements and a reflective layer. The ring-shaped light guide plate has a plurality of accommodating recesses disposed on an outer ring surface of the ring-shaped light guide plate and separated from each other. The circuit board surrounds a portion of the outer ring surface of the ring-shaped light guide plate. The top light-emitting elements are disposed on the circuit board and respectively located in the accommodating recesses. The reflective layer covers a portion of an inner ring surface and a first side surface of the ring-shaped light guide plate. A light emitting device including the aforementioned ring-shaped light guide module is also provided.

9 Claims, 6 Drawing Sheets

RING-SHAPED LIGHT GUIDE MODULE AND LIGHT EMITTING DEVICE

FIELD OF THE INVENTION

The present disclosure relates to a ring-shaped light guide module and a light emitting device including the ring-shaped light guide module.

BACKGROUND OF THE INVENTION

Among the existing ring-shaped light-emitting designs, a ring-shaped optical fiber is mainly used. However, the ring-shaped optical fiber can only emit light in a single region, and a dark region is formed at a junction of the ring-shaped optical fiber. In addition, the price of the ring-shaped optical fiber is quite expensive. As for light-emitting elements matched with a ring-shaped lens, since the light-emitting elements are disposed beneath the ring-shaped lens, those occupy a large space. If a distance between the light-emitting elements and the ring-shaped lens is reduced in order to reduce the occupied space, it may cause uneven brightness and hot spot phenomenon. Accordingly, there is a need in the art for an improved ring-shaped light-emitting structure to solve the above technical issues.

SUMMARY OF THE INVENTION

The present disclosure provides a ring-shaped light guide module, which includes a ring-shaped light guide plate, a circuit board, a plurality of top light-emitting elements and a reflective layer. The ring-shaped light guide plate has a plurality of accommodating recesses disposed on an outer ring surface of the ring-shaped light guide plate and separated from each other. The circuit board surrounds a portion of the outer ring surface of the ring-shaped light guide plate. The top light-emitting elements are disposed on the circuit board and respectively located in the accommodating recesses. The reflective layer covers a portion of an inner ring surface and a first side surface of the ring-shaped light guide plate.

In some embodiments of the present disclosure, the ring-shaped light guide plate further has a ring-shaped recess communicating with the accommodating recesses, and the circuit board is located in the ring-shaped recess.

In some embodiments of the present disclosure, a thickness of the ring-shaped light guide plate decreases from a first side of the ring-shaped light guide plate to a second side thereof, and the second side is a light-exiting side.

In some embodiments of the present disclosure, a second side surface of the ring-shaped light guide plate opposite to the first side surface is a light-exiting surface.

In some embodiments of the present disclosure, the inner ring surface of the ring-shaped light guide plate has a first inclined surface and a second inclined surface, and the second inclined surface is connected between the first inclined surface and the second side surface, and a width of the first inclined surface is greater than a width of the second inclined surface.

In some embodiments of the present disclosure, a slope of the second inclined surface is greater than a slope of the first inclined surface.

In some embodiments of the present disclosure, the reflective layer covers a portion of the first inclined surface.

In some embodiments of the present disclosure, the reflective layer is a reflective coating directly attached to the portion of the inner ring surface and the first side surface of the ring-shaped light guide plate.

In some embodiments of the present disclosure, the ring-shaped light guide plate is made of a light guide material containing a plurality of light diffusing particles.

The present disclosure also provides a light emitting device, which includes the aforementioned ring-shaped light guide, a cover and a casing. The cover covers the inner ring surface of the ring-shaped light guide plate. The casing covers the circuit board and the outer ring surface of the ring-shaped light guide plate.

BRIEF DESCRIPTION OF THE DRAWINGS

Aspects of the present disclosure are best understood from the following embodiments, read in conjunction with accompanying drawings. However, it should be understood that in accordance with common practice in the industry, various features have not necessarily been drawn to scale. Indeed, shapes of the various features may be suitably adjusted for clarity, and dimensions of the various features may be arbitrarily increased or decreased.

DETAIL DESCRIPTION OF THE PREFERRED EMBODIMENT

Figure 1:
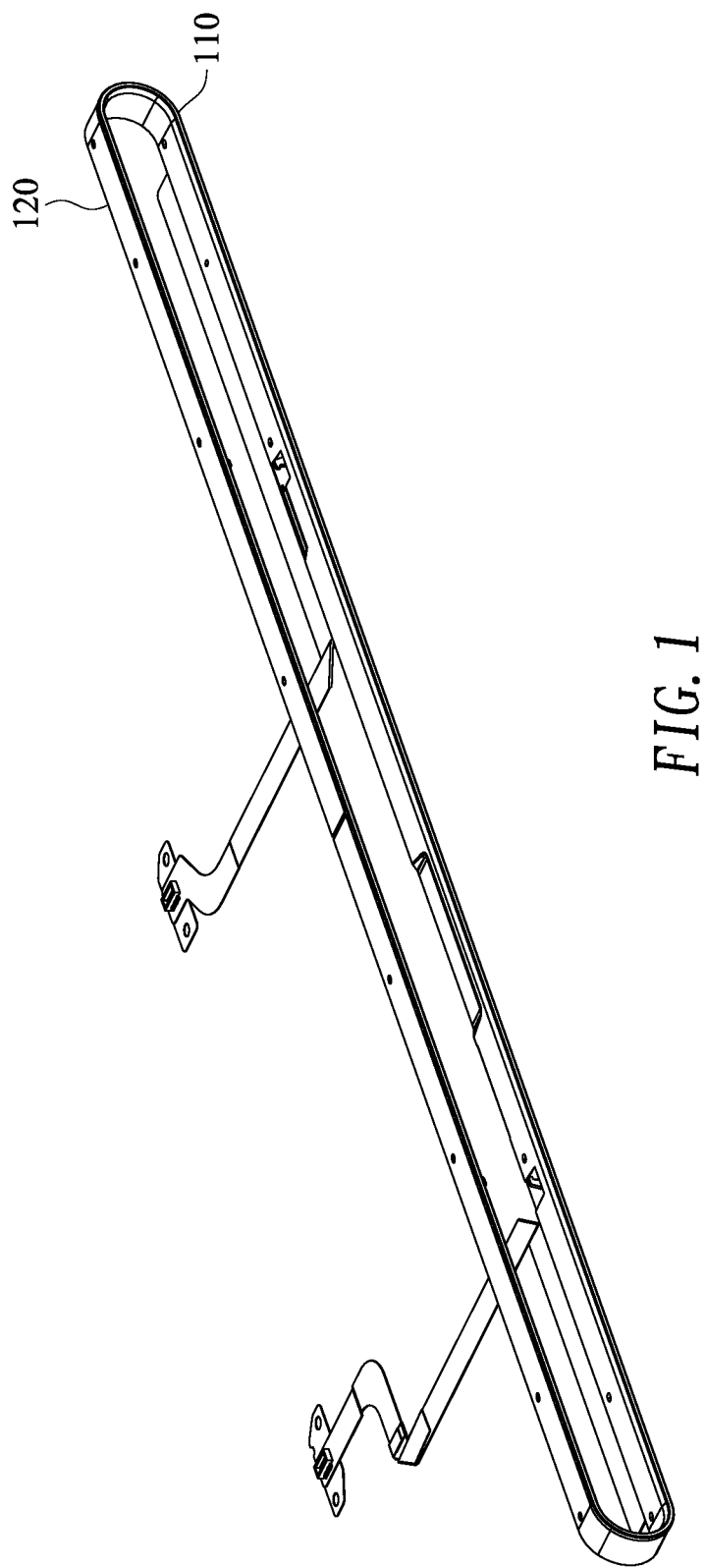
FIG. 1 is a perspective view of a ring-shaped light guide module according to an embodiment of the present invention.

The advantages and features of the present disclosure and the method for achieving the same will be described in more detail with reference to exemplary embodiments and accompanying drawings to make it easier to understand. However, the present disclosure can be implemented in different forms and should not be construed as being limited to the embodiments set forth herein. On the contrary, for those skilled in the art, the provided embodiments will make this disclosure more thorough, comprehensive and complete to convey the scope of the present disclosure.

The spatially relative terms in the text, such as "beneath" and "over", are used to facilitate the description of the relative relationship between one element or feature and another element or feature in the drawings. The true meaning of the spatially relative terms includes other orientations. For example, when the drawing is flipped up and down by 180°, the relationship between the one element and the other element may change from "beneath" to "over." The spatially relative descriptions used herein should be interpreted the same.

As mentioned in background of the invention, both the existing ring-shaped optical fiber and the light-emitting elements matched with the ring-shaped lens have disadvantages. Specifically, the ring-shaped optical fiber can only emit light in the single region, and the dark region is formed at the junction of the ring-shaped optical fiber. In addition, the price of the ring-shaped optical fiber is quite expensive. As for the light-emitting elements matched with the ring-shaped lens, those occupy the large space. If the distance between the light-emitting elements and the ring-shaped lens is reduced in order to reduce the occupied space, it may cause uneven brightness and hot spot phenomenon. Accordingly, the present invention provides a ring-shaped light guide module, which still has good light emitting uniformity when a size of the light guide plate is small, and thus can meet the current requirement for thinner appearance of the light guide module and has low cost. Various embodiments of the ring-shaped light guide module and the light emitting device including the ring-shaped light guide module of the present invention will be described in detail below.

Figure 2:
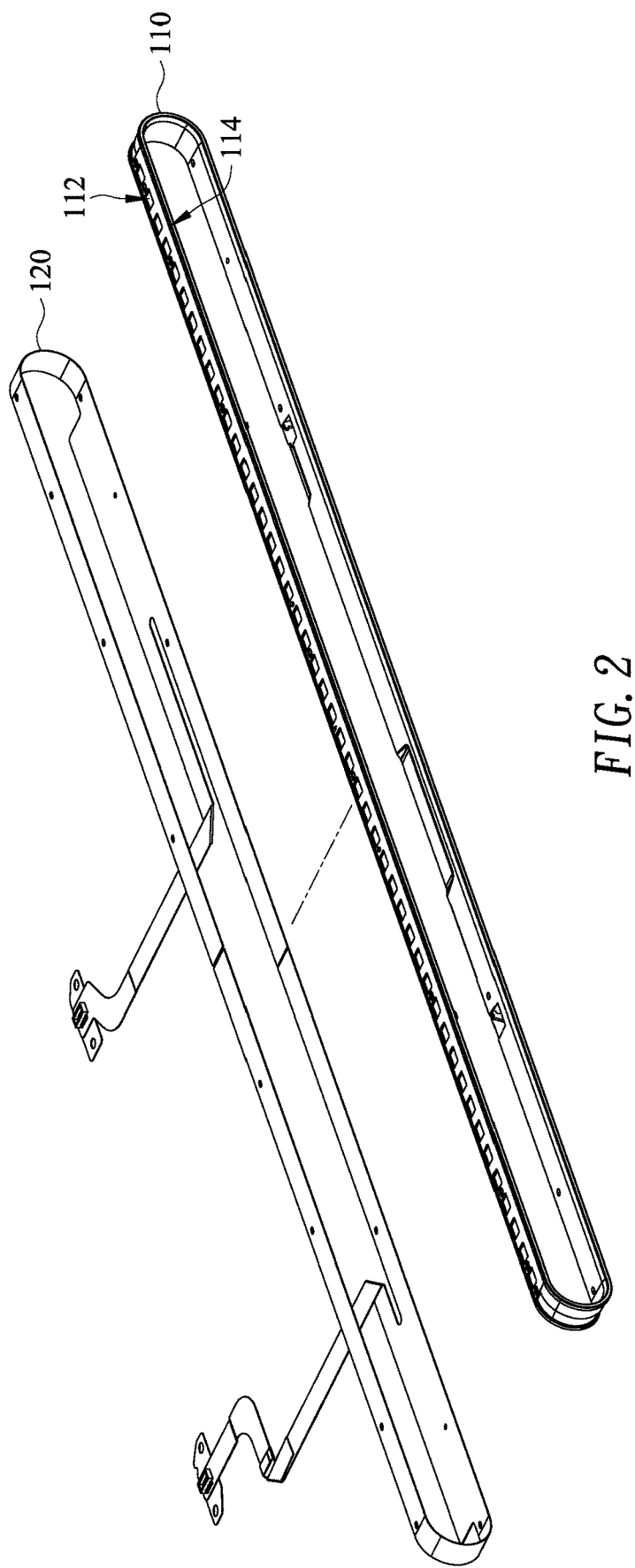
FIG. 2 is an exploded perspective view of the ring-shaped light guide module in FIG. 1.
Figure 3:
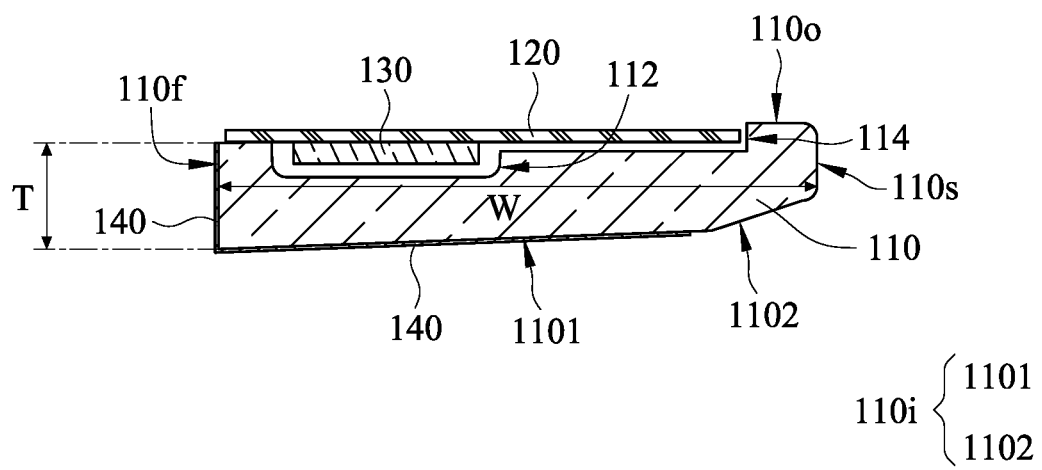
FIG. 3 is a cross-sectional view of a portion of the ring-shaped light guide module in FIG. 1.
Figure 3:
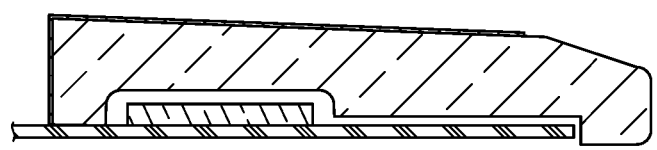

The present invention provides a ring-shaped light guide module, which includes a ring-shaped light guide plate, a circuit board, a plurality of top light-emitting elements and a reflective layer. FIG. 1 is a perspective view of a ring-shaped light guide module according to an embodiment of the present invention (the reflective layer is not shown in FIG. 1). FIG. 2 is an exploded perspective view of the ring-shaped light guide module in FIG. 1 (the top light-emitting elements and the reflective layer are not shown in FIG. 2). FIG. 3 is a cross-sectional view of a portion of the ring-shaped light guide module in FIG. 1. As shown in FIGS. 1 to 3, the ring-shaped light guide module includes a ring-shaped light guide plate 110, a circuit board 120, a plurality of top light-emitting elements 130 and a reflective layer 140.

As shown in FIGS. 2 and 3, the ring-shaped light guide plate 110 has a plurality of accommodating recesses 112. The accommodating recesses 112 are disposed on an outer ring surface 1100 of the ring-shaped light guide plate 110 and separated from each other. The accommodating recesses 112 are configured to accommodate the top light-emitting elements 130, respectively. In some embodiments, as shown in FIG. 3, the ring-shaped light guide plate 110 further has a ring-shaped recess 114 communicating with the accommodating recesses 112. The ring-shaped recess 114 is configured to accommodate the circuit board 120. In some embodiments, the ring-shaped light guide plate 110 is made of a light-guiding material containing a plurality of light-diffusing particles, so as to improve the light emitting uniformity of the ring-shaped light guide module.

In some embodiments, a thickness of the ring-shaped light guide plate 110 decreases from a first side of the ring-shaped light guide plate 110 (e.g., the left side of FIG. 3) to a second side thereof (e.g., the right side of FIG. 3), and the second side is a light-exiting side. In some embodiments, in addition to the outer ring surface 1100, the ring-shaped light guide plate 110 has an inner ring surface 110i, a first side surface 110f, and a second side surface 110s, and the outer ring surface 1100 and the inner ring surface 110i are opposite to each other, and the first side surface 110f and the second side surface 110s are opposite to each other, in which the second side surface 110s opposite to the first side surface 110f is a light-exiting surface. In some embodiments, the inner ring surface 110i has a first inclined surface 1101 and a second inclined surface 1102, and the second inclined surface 1102 is connected between the first inclined surface 1101 and the second side surface 110s, and a width of the first inclined surface 1101 is greater than a width of the second inclined surface 1102. In some embodiments, a slope of the second inclined surface 1102 is greater than a slope of the first inclined surface 1101. In some embodiments, when the user looks into the ring-shaped light guide module from the second side surface 110s, internal components (e.g., the reflective layer 140) will not be seen.

Please refer to FIG. 3, a maximum width W and a maximum thickness T of the ring-shaped light guide plate 110 may be properly adjusted so that the light guide plate 130 has good optical performance. In some embodiments, the maximum width W of the miniaturized ring-shaped light guide plate 110 is between 4 mm and 10 mm, but the present invention is not limited thereto, and the maximum width W of the ring-shaped light guide plate 110 may be properly adjusted according to space configuration inside an electronic device. Therefore, the ring-shaped light guide plate 110 is not limited to the aforementioned range of the maximum width W. In some embodiments, the maximum thickness T of the miniaturized ring-shaped light guide plate 110 is between 1.5 mm and 2.0 mm, but the present invention is not limited thereto, and the maximum thickness T of the ring-shaped light guide plate 110 may be properly adjusted according to space configuration inside the electronic device. Therefore, the ring-shaped light guide plate 110 is not limited to the aforementioned range of the maximum thickness T.

As shown in FIGS. 1 to 3, the circuit board 120 surrounds a portion of the outer ring surface 1100 of the ring-shaped light guide plate 110. In some embodiments, the circuit board 120 covers the portion of the outer ring surface 1100 of the ring-shaped light guide plate 110. In some embodiments, the circuit board 120 does not cover another portion of the outer ring surface 1100 of the ring-shaped light guide plate 110, which is close to the light-exiting side. In some embodiments, the circuit board 120 is located within the ring-shaped recess 114. In some embodiments, the circuit board 120 is a flexible printed circuit board (FPCB). In some embodiments, the circuit board 120 may be attached to the ring-shaped light guide plate 110 through an adhesive layer (e.g., double-sided tape), but the present invention is not limited thereto.

As shown in FIGS. 2 and 3, the top light-emitting elements 130 are disposed on the circuit board 120 and located in the accommodating recesses 112, respectively, so bottom surfaces of the accommodating recesses 112 may be called light-incident surfaces. In some embodiments, the top light-emitting element 130 is a light-emitting diode (LED) unit, an organic light-emitting diode (OLED) unit, a quantum dot light-emitting diode (QLED) unit, or an electroluminescence (EL) unit.

As shown in FIG. 3, the reflective layer 140 covers a portion of the inner ring surface 110i and the first side surface 110f of the ring-shaped light guide plate 110. In some embodiments, the reflective layer 140 covers a portion of the first inclined surface 1101, but the present invention is not limited thereto, and the coverage of the reflective layer 140 may be properly adjusted.

In some embodiments, the reflective layer 140 is a reflective coating directly attached (e.g., formed by spraying or other suitable coating methods) to the portion of the inner ring surface 110i and the first side surface of the ring-shaped light guide plate 110 110f, so its optical reflection effect is better than an optical reflection effect of a general reflective sheet adhered to a surface of a light-guide plate through an adhesive layer. However, the present invention is not limited thereto, and the reflective layer 140 may also be the reflective sheet.

It is worth noting that the inventors found that when the ring-shaped light guide plate 110 of the present invention has the maximum width W of 4 mm to 10 mm and the maximum thickness T of 1.5 mm to 2.0 mm, its light emitting uniformity is greater than or equal to 70%. If the aforementioned top light-emitting elements 130 of the ring-shaped light guide module are replaced with a plurality of side-view light-emitting elements, which emit light toward the second side surface 110s (i.e., the light-exiting surface), light emitting uniformity of this ring-shaped light guide module becomes lower (greater than or equal to 40%). If the maximum width of the ring-shaped light guide plate of the aforementioned ring-shaped light guide module (using the side-view light-emitting elements, which emit light toward the second side surface 110s) is increased to about 1.75 times of the original maximum width of the ring-shaped light guide module, and the maximum thickness is increased to about 1.1 times of the original maximum thickness thereof, light emitting uniformity of the ring-shaped light guide module can be greater than or equal to 70%. From this, it can be seen that the ring-shaped light guide module using the top light-emitting elements of the present invention can indeed meet the current requirements for the thinner appearance and the light emitting uniformity of the light guide module at the same time.

Figure 4:
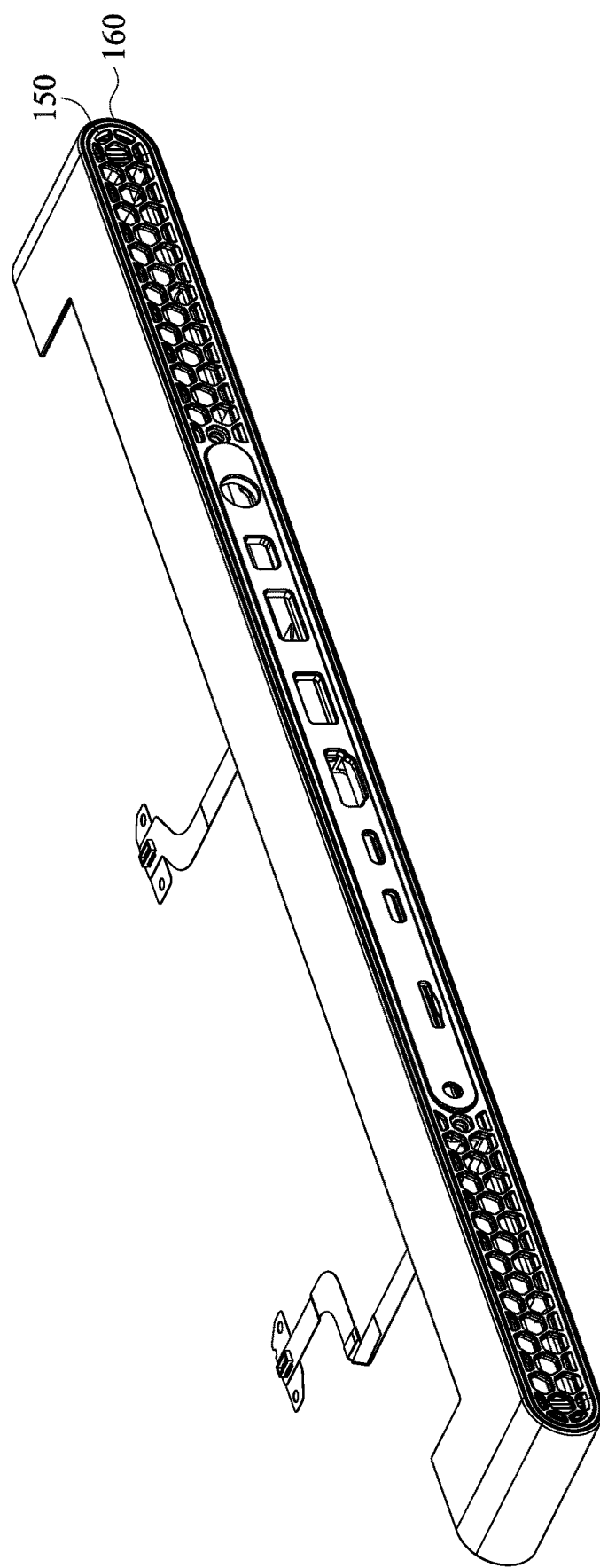
FIG. 4 is a perspective view of a light emitting device according to an embodiment of the present invention.
Figure 5:
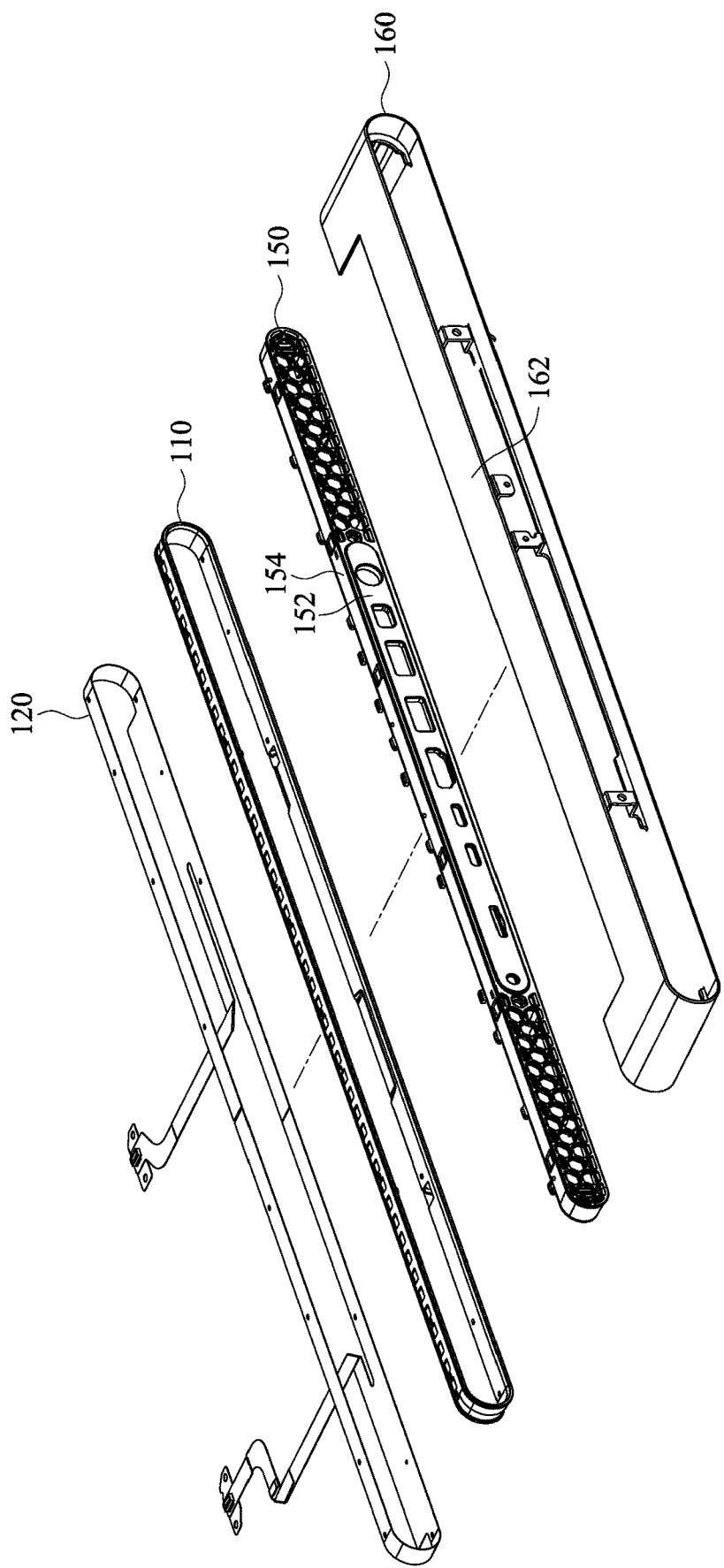
FIG. 5 is an exploded perspective view of the light emitting device in FIG. 4.
Figure 6:
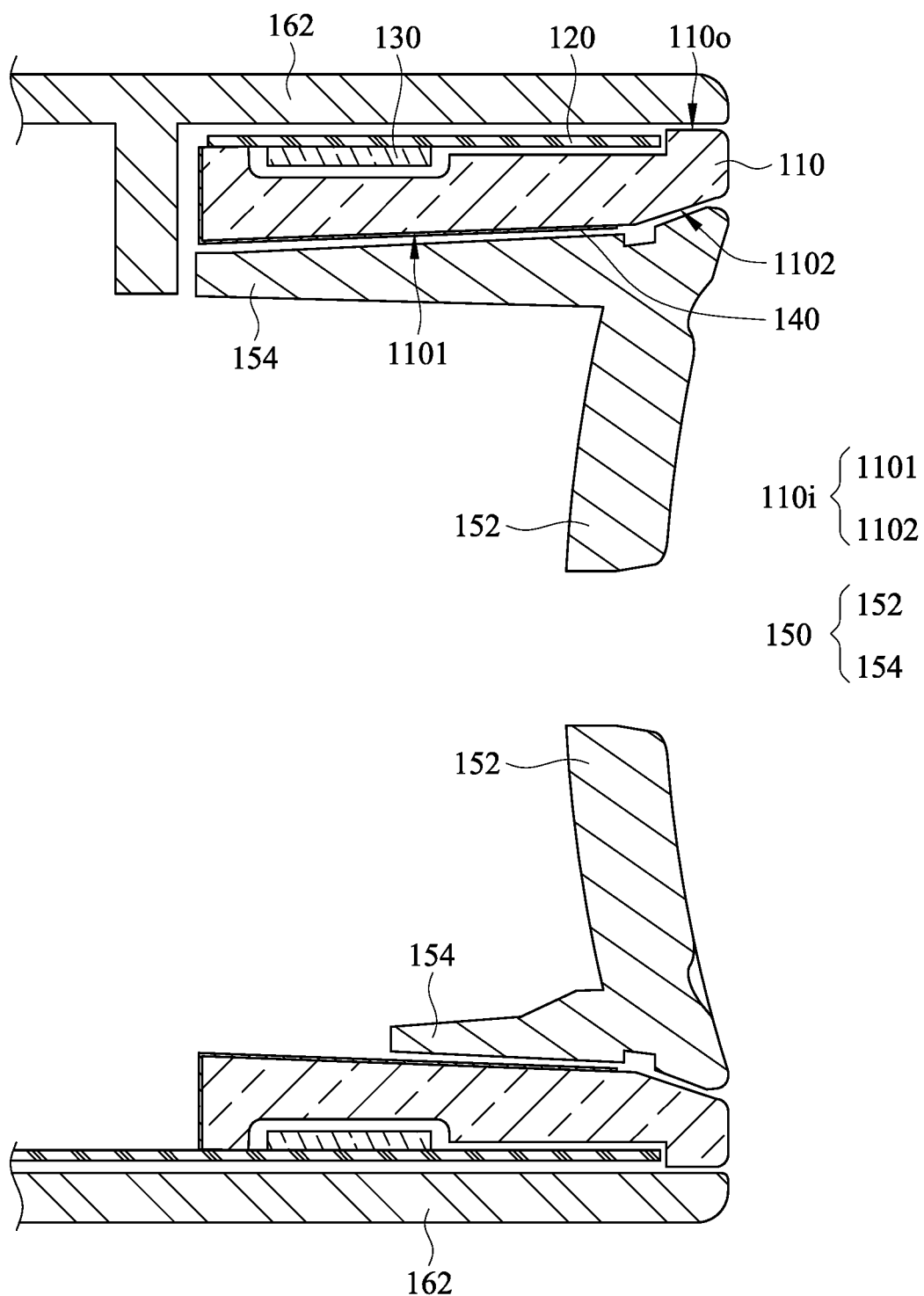
FIG. 6 is a cross-sectional view of a portion of the light emitting device in FIG. 4.

The present invention further provides a light emitting device including the above-mentioned ring-shaped light guide module (including the ring-shaped light guide plate, the circuit board, the top light-emitting elements and the reflective layer), a cover and a casing. FIG. 4 is a perspective view of a light emitting device according to an embodiment of the present invention (the reflective layer is not shown in FIG. 4). FIG. 5 is an exploded perspective view of the light emitting device in FIG. 4 (the top light-emitting elements and the reflective layer are not shown in FIG. 5). FIG. 6 is a cross-sectional view of a portion of the light emitting device in FIG. 4. As shown in FIGS. 4 to 6, the light emitting device includes the ring-shaped light guide module shown in FIGS. 1 to 3 (including the ring-shaped light guide plate 110, the circuit board 120, the top light-emitting elements 130 and the reflective layer 140), a cover 150 and a casing 160. In some embodiments, the light emitting device may be disposed in an electronic device, for example, disposed on a casing of a desktop or a notebook or a casing of peripheral connection ports thereof. The light-emitting visual effect of the light emitting device may be used to remind the user of the location and/or the usage status of the peripheral connection ports.

As shown in FIGS. 4 to 6, the cover 150 covers the inner ring surface 110i of the ring-shaped light guide plate 110. In some embodiments, as shown in FIG. 5, the cover 150 includes a decorative portion 152 and a supporting portion 154 connected to each other. The decorative portion 152 is provided with openings of the peripheral connection ports. The supporting portion 154 covers the inner ring surface 110i of the ring-shaped light guide plate 110. In some embodiments, as shown in FIG. 6, the supporting portion 154 covers the first inclined surface 1101 and the second inclined surface 1102.

As shown in FIGS. 4 to 6, the casing 160 covers the circuit board 120 and the outer ring surface 110o of the ring-shaped light guide plate 110. In some embodiments, as shown in FIG. 5, the casing 160 includes a side wall portion 162 covering the circuit board 120 and the outer ring surface 110o of the ring-shaped light guide plate 110.

However, it should be noted that shapes of the cover 150 and/or the casing 160 shown in FIGS. 4 to 6 can be appropriately changed to meet space configuration requirements of various light emitting devices.

However, the above are only the preferred embodiments of the present disclosure, and should not be used to limit the scope of implementation of the present disclosure, that is, simple equivalent changes and modifications made in accordance with claims and description of the present disclosure are still within the scope of the present disclosure. In addition, any embodiment of the present disclosure or claim does not need to achieve all the objectives or advantages disclosed in the present disclosure. In addition, the abstract and the title are not intended to limit the scope of claims of the present disclosure.

What is claimed is:

1. A ring-shaped light guide module, comprising:
   a ring-shaped light guide plate having a plurality of accommodating recesses disposed on an outer ring surface of the ring-shaped light guide plate and separated from each other, wherein a thickness of the ring-shaped light guide plate decreases from a first side of the ring-shaped light guide plate to a second side thereof, and the second side is a light-exiting side;
   a circuit board surrounding a portion of the outer ring surface of the ring-shaped light guide plate;
   a plurality of top light-emitting elements disposed on the circuit board and respectively located in the accommodating recesses; and
   a reflective layer covering a portion of an inner ring surface and a first side surface of the ring-shaped light guide plate.

2. The ring-shaped light guide module of claim 1, wherein the ring-shaped light guide plate further has a ring-shaped recess communicating with the accommodating recesses, and the circuit board is located in the ring-shaped recess.

3. The ring-shaped light guide module of claim 1, wherein a second side surface of the ring-shaped light guide plate opposite to the first side surface is a light-exiting surface.

4. The ring-shaped light guide module of claim 3, wherein the inner ring surface of the ring-shaped light guide plate has a first inclined surface and a second inclined surface, and the second inclined surface is connected between the first inclined surface and the second side surface, and a width of the first inclined surface is greater than a width of the second inclined surface.

5. The ring-shaped light guide module of claim 4, wherein a slope of the second inclined surface is greater than a slope of the first inclined surface.

6. The ring-shaped light guide module of claim 4, wherein the reflective layer covers a portion of the first inclined surface.

7. The ring-shaped light guide module of claim 1, wherein the reflective layer is a reflective coating directly attached to the portion of the inner ring surface and the first side surface of the ring-shaped light guide plate.

8. The ring-shaped light guide module of claim 1, wherein the ring-shaped light guide plate is made of a light guide material containing a plurality of light diffusing particles.

9. A light emitting device, comprising:
   the ring-shaped light guide module of claim 1;
   a cover covering the inner ring surface of the ring-shaped light guide plate; and
   a casing covering the circuit board and the outer ring surface of the ring-shaped light guide plate.

* * * * *